United States Patent
Kurungot et al.

(10) Patent No.: US 10,658,690 B2
(45) Date of Patent: May 19, 2020

(54) PHYTIC ACID BASED METALLOGEL AND APPLICATIONS THEREOF

(71) Applicant: Council of Scientific & Industrial Research, New Delhi (IN)

(72) Inventors: Sreekumar Kurungot, Pune (IN); Rahul Banerjee, Pune (IN); Harshitha Barike Aiyappa, Pune (IN); Subhadeep Saha, Puna (IN); Pritish Wadge, Puna (IN)

(73) Assignee: Council of Scientific & Industrial Research, New Delhi (IN)

( * ) Notice: Subject to any disclaimer, the term of this patent is extended or adjusted under 35 U.S.C. 154(b) by 521 days.

(21) Appl. No.: 15/503,246

(22) PCT Filed: Aug. 12, 2015

(86) PCT No.: PCT/IN2015/050089
§ 371 (c)(1),
(2) Date: Feb. 10, 2017

(87) PCT Pub. No.: WO2016/024292
PCT Pub. Date: Feb. 18, 2016

(65) Prior Publication Data
US 2017/0229725 A1 Aug. 10, 2017

(30) Foreign Application Priority Data
Aug. 12, 2014 (IN) .......................... 2296/DEL/2014

(51) Int. Cl.
*H01M 8/00* (2016.01)
*H01M 8/1016* (2016.01)
*C07F 15/02* (2006.01)
*H01B 1/12* (2006.01)

(52) U.S. Cl.
CPC ......... *H01M 8/1016* (2013.01); *C07F 15/025* (2013.01); *H01B 1/122* (2013.01); *H01M 2300/0085* (2013.01)

(58) Field of Classification Search
CPC .................. H01B 1/122; C07F 15/025; H01M 2300/0085; H01M 8/1016
See application file for complete search history.

(56) References Cited

FOREIGN PATENT DOCUMENTS

| CN | 102093414 A | * | 6/2011 | |
|---|---|---|---|---|
| CN | 104022301 | | 9/2014 | |
| EP | 2098483 A1 | * | 9/2009 | ............. C01B 25/45 |
| EP | 2098483 A1 | | 9/2009 | |
| JP | 2008198446 | | 8/2008 | |
| KR | 2014046157 A | * | 4/2014 | ............. H01M 12/06 |

OTHER PUBLICATIONS

Kauffman, "Hydrate", Encyclopedia Britannica, Mar. 2016.*
(Continued)

*Primary Examiner* — Cynthia H Kelly
*Assistant Examiner* — Monique M Wills
(74) *Attorney, Agent, or Firm* — Blank Rome LLP

(57) ABSTRACT

The present invention to provide a highly proton conducting metal organic material constituting of phosphate ester based ligand immobilized via gelation with $Fe^{3+}$ ion in DMF which is used as conducting electrolyte in PEFMCs.

3 Claims, 13 Drawing Sheets

(56) References Cited

OTHER PUBLICATIONS

Li et al., "Enhanced Proton Conductivity of Nafion Hybrid Membrane under Different Humidities by Incorporating Metal-Organic Frameworks With High Phytic Acid Loading", Jun. 2014, ACS Applied Materials, p. 9799-9807.*
Hamilton et al. "Thixotropic Hydrogel Derived from a Product of an Organic Solid-State Synthesis: Properties and Densities of Metal-Organic Nanoparticles", Journal of the American Chemical Society, 133, 3365-3371, 2011.*
Aiyappa et al. "A distinctive $PdCl_2$-mediated transformation of Fe-based metallogels into metal-organic frameworks" Crystal Growth & Design, 2014, 14, pp. 3434-3437.
Li et al. "Enhanced proton conductivity of nafion hybrid membrane under different humidities by incorporating metal-organic frameworks with high phytic acid loading" Applied Materials& Interfaces, 2014, 6, pp. 9799-9807.
Asghar et al. "Influence of phytic acid and its metal complexes on the activity of pectin degrading polygalacturonase" Carbohydrate Polymers, 2013, 95, pp. 167-170.
Saha et al. "Proton-conducting supramolecular metallogels from the lowest molecular weight assembler ligand: A quote from simplicity" Chem. Eur. J., 2013, 19, pp. 9562-9568.
Weber et al. "Proton conductivity enhancement by nanostructural control of poly(benzimidazole)-phosphoric acid adducts**" Adv. Mater., 2008, 20, pp. 2595-2598.
International Search Report and Written Opinion issued in PCT/IN2015/055089 dated Jan. 1, 2016.

\* cited by examiner

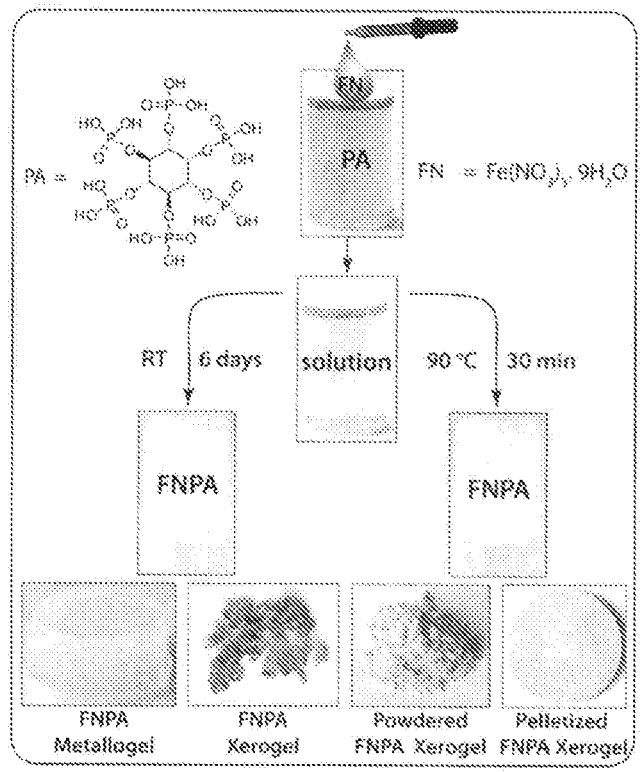
Fig: 1
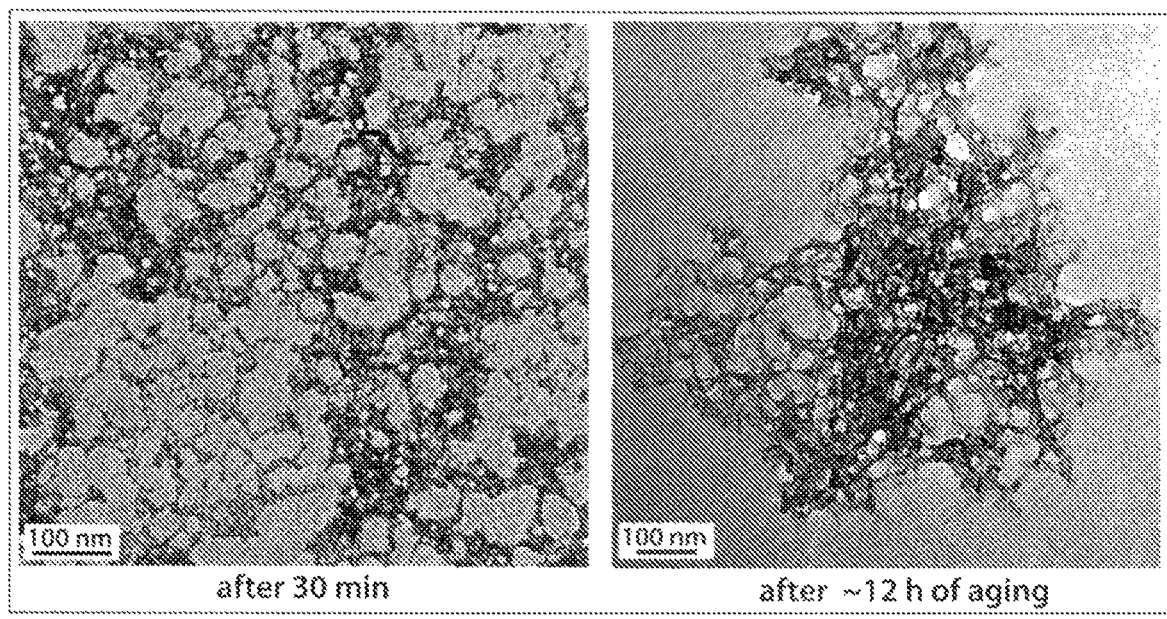
Fig: 2

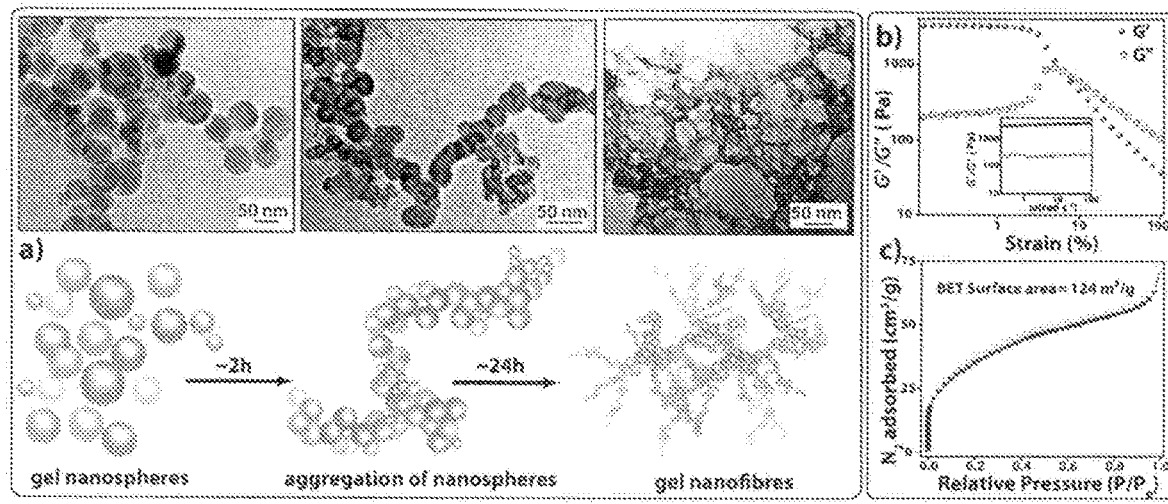
Fig: 3
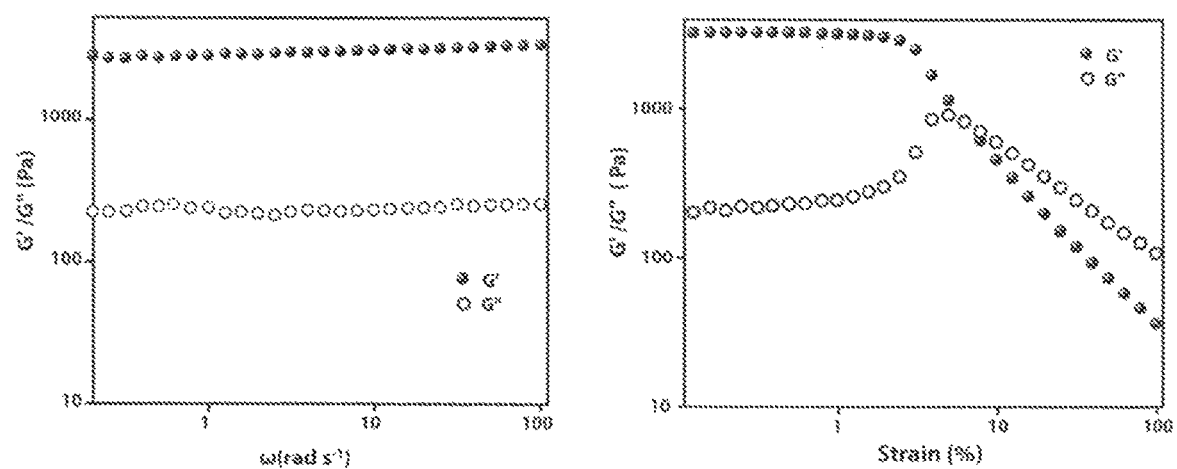
Fig: 4

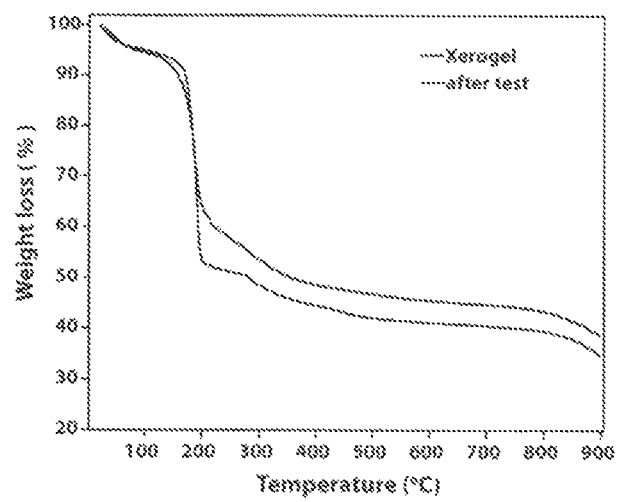
Fig: 6
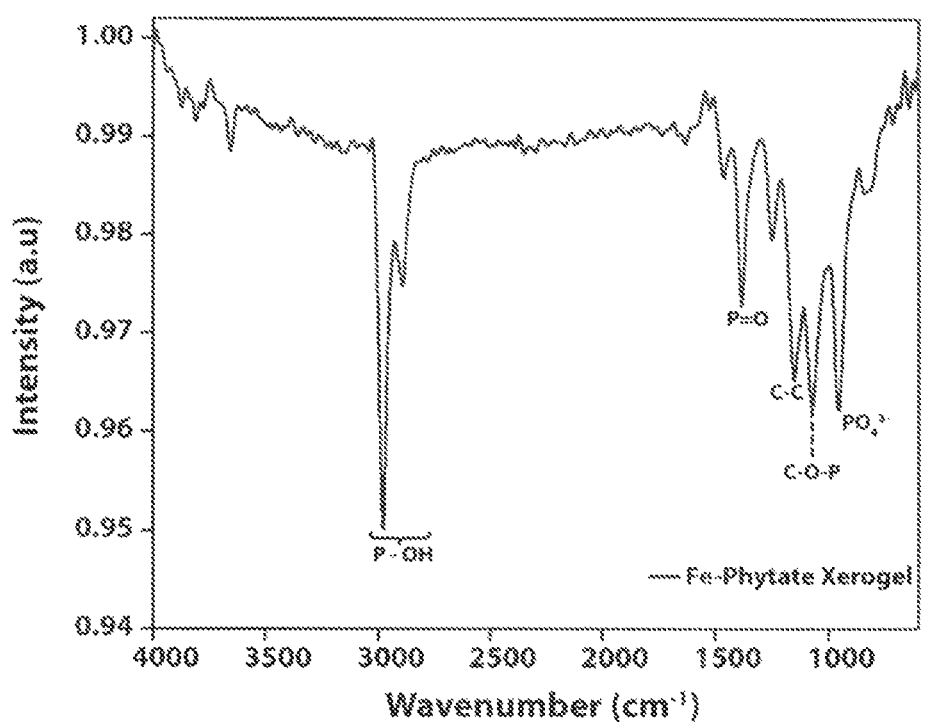
Fig: 7

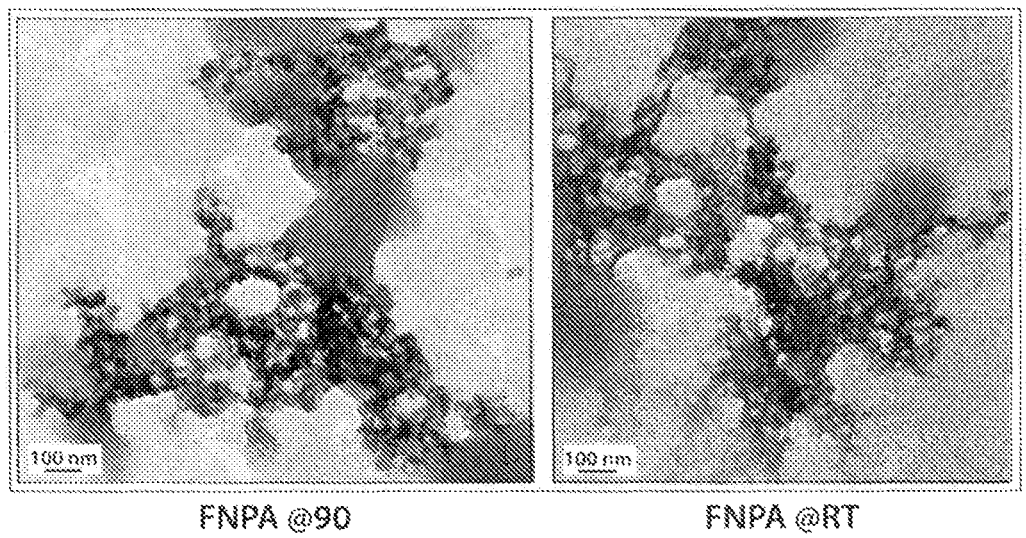
Fig: 12
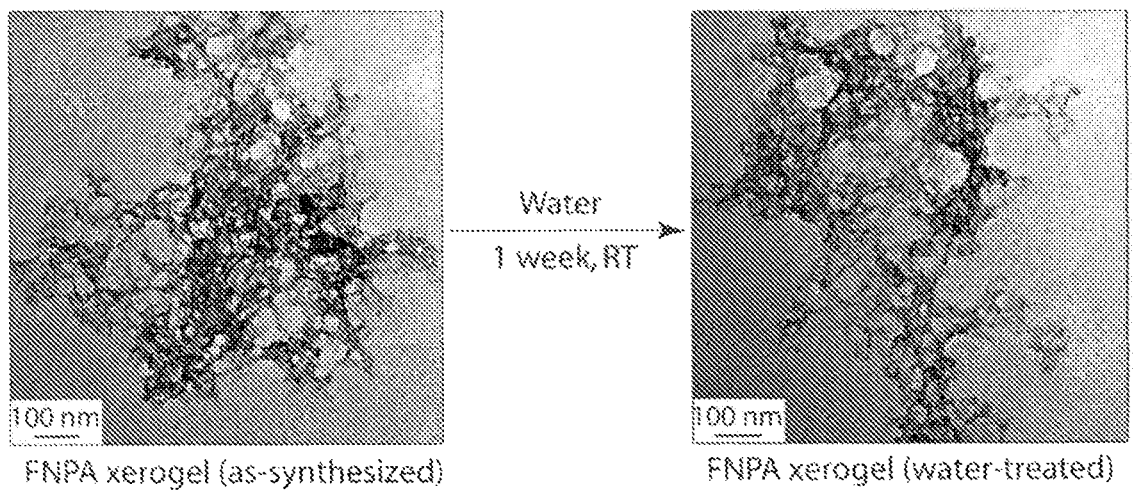
Fig: 13

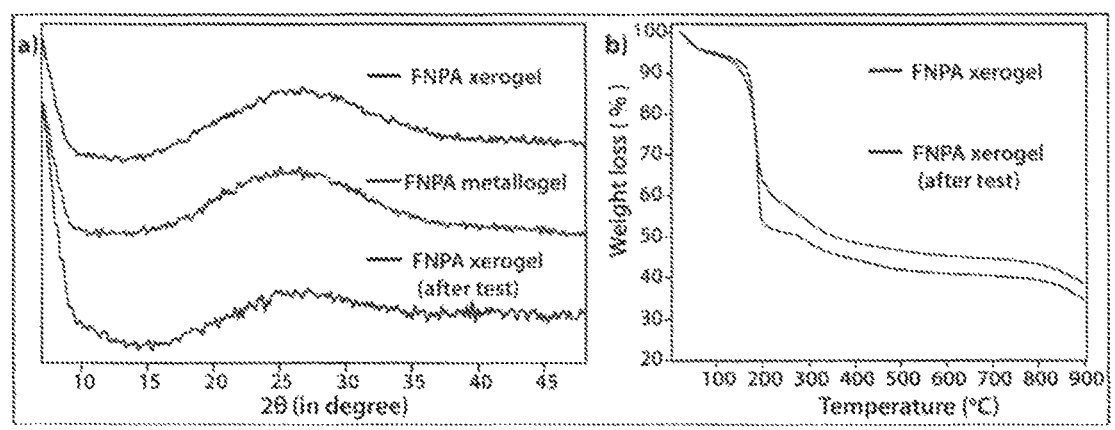
Fig: 14
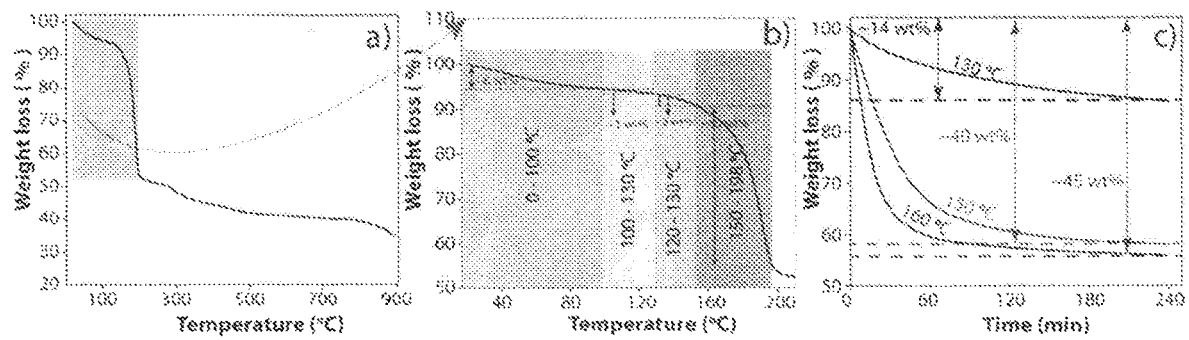
Fig: 15

Fig: 18

PHYTIC ACID BASED METALLOGEL AND APPLICATIONS THEREOF

RELATED APPLICATIONS

This application is a national phase of PCT/IN2015/050089, filed on Aug. 12, 2015, which claims the benefit of Indian Patent Application No. 2296/DEL/2014, filed on Aug. 12, 2014. The contents of those applications are hereby incorporated by reference.

FIELD OF THE INVENTION

The present invention relates to immobilized phytic acid for fuel cell application. Particularly, present invention relates to ferric nitrate-phytic acid (FNPA) metallogel and process for preparation thereof.

BACKGROUND AND PRIOR ART OF THE INVENTION

Metallogels are an important class of supramolecular materials, whose intrinsic properties stem from the non-covalent interaction between the metallic entity (metal or metal ion), and organic linker (polymer or small organic molecules) resulting in a stable extended network with voluminous immobilization of solvent molecules within it. Most of the metallogelators result from non-covalent interactions, mainly hydrogen bonding apart from metal-ligand coordination. An important property of metallogels lies in their ability to conduct protons due to the inherent H-bonding. Therefore, these materials could be utilized as proton conducting solid electrolyte in Proton Exchange Membrane Fuel Cells (PEMFC) as it demands a material with ability to conduct protons at high temperature (>100° C.) in dry conditions apart from high mechanical stability. This would essentially perk up the resistance to fuel cell impurities, improve the electrode kinetics apart from resolving the flooding issues, normally encountered in Nafion® based PEMFCs.

An important alternative for High Temperature Proton Exchange Membrane Fuel Cells (HT-PEFMCs) are phosphoric acid doped-Polybenzimidazole (PBI) membranes having high proton conductivity at temperatures up to 200° C. However, one of the problems affecting its performance is the leaching of phosphoric acid at higher levels of doping which limit any further improvement in its conductivity.

In the light of the above, it is evident that any prospective material that can be used as a solid electrolyte in a proton exchange fuel cell, needs to satisfy two criteria viz., (1) to separate the anode and cathode components (mainly the reactant gases) (2) to conduct protons across it, thereby completing the external electrical circuit and making the fuel cell operational for production of electricity.

Therefore, there exists a need for an intrinsically conducting electrolyte which could not only fasten and selectively transport proton at high temperature (100-200° C.) under anhydrous conditions but also effectively separate the electrode materials and reactant gases for an optimal overall performance of the PEFMC's. In this perspective, thermally as well as chemically stable metallogels might offer a perfect platform for immobilizing the proton conducting units via their coordination to the metal centers. However, till date, there are limited examples of such metallogels employed as proton conductors, one being a CuA-Ox xerogel, which exhibits a protonic conductivity of 1.4×10-5 S cm-1 at 65° C. under anhydrous conditions. It is well known that the proton conductivity depends on the number and mobility of charge carriers (protons).

Among the known protogenic molecules, phosphoric acid derived phytic acid (inositol hexakisphosphate) contains 12 replaceable protons and is thus capable of easily coordinating to multivalent ions. Moreover each phytic acid (PA) molecule contains six 6 phosphate ester ($H_2PO_4$) groups, well known for its amphoteric nature that allows proton conduction without any assistance from external proton carriers.

Although, phytic acid metallic complexes are known in the art, however, these are used to inhibit Polygalacturonase activity in microorganism which causes pathogenicity and spoilage of fruits and vegetables during plant tissue infections (Carbohydrate Polymers. Volume 95. Issue 1, 5 Jun. 2013, Pages 167-170).

Article titled "Proton-Conducting Supramolecular Metallogels from the Lowest Molecular Weight Assembler Ligand: A Quote for Simplicity" by S Saha et al. published in Chemistry—A European Journal, 2013, 19 (29), pp 9562-9568 two novel multifunctional metallogels were readily prepared at room temperature by simple mixing of stock solutions of $Cu^{II}$ acetate monohydrate or $Cu^{II}$ perchlorate hexahydrate and oxalic acid dihydrate.

Article titled "Proton conductivity enhancement by nanostructural control of poly(benzimidazole)-phosphoric acid adduct" by J Weber et al. published in Advanced materials, 2008, 20 (13), pp 2595-2598 reports mesoporous polybenzimidazole doped with phosphoric acid which shows enhanced proton conductivity compared to an equivalent, nonporous membrane. The introduction of a defined nanostructure into cross-linked poly(benzimidazole)/phosphoric acid composites is thus a promising approach towards membranes of high temperature stability suitable for fuel cell applications.

CN104022301A discloses a polymer—supported metal-organic framework materials phytic acid composite membrane preparation method and application. The membrane material prepared through the preparation method is good in proton conduction property even under low humidity.

Article titled "Enhanced proton conductivity of nafion hybrid membrane under different humidities by incorporating metal-organic frameworks with high phytic acid loading" by Z Li et al. published in ACS Appl Mater Interfaces, 2014; 6 (12), pp 9799-9807 reports Nafion/phytic@MIL hybrid membranes showed high proton conductivity at different RHs. In this study, phytic acid (myo-inositol hexaphosphonic acid) was first immobilized by MIL101 via vacuum-assisted impregnation method. The obtained phytic@MIL101 was then utilized as a novel filler to incorporate into Nafion to fabricate hybrid proton exchange membrane for application in PEMFC under different relative humidities (RHs), especially under low RHs.

In the light of the foregoing, there is an unmet need in the art to develop an intrinsically conducting electrolyte which could not only fasten and selectively transport proton at high temperature (100-200° C.) under anhydrous conditions but also effectively separate the electrode materials and reactant gases, for an optimal overall performance of the PEFMC's. Accordingly, the inventors of present invention had developed a ferric nitrate-phytic acid (FNPA) metallogel for use as conducting electrolyte in PEFMCs.

OBJECT OF THE INVENTION

The main objective of the present invention to provide a highly proton conducting metal organic material constituting of phosphate ester based ligand immobilized via gelation with $Fe^{3+}$ ion in DMF.

Another objective of present invention is to provide a process for the preparation of ferric nitrate-phytic acid (FNPA) metallogel by immobilizing a protogenic ligand (phytic acid) using iron (III) nitrate in N, N'-Dimethyformamide (DMF).

Still another objective of present invention is to provide use of a ferric nitrate-phytic acid (FNPA) metallogel as conducting electrolyte in PEFMCs.

SUMMARY OF THE INVENTION

Accordingly, present invention provides a proton conducting metallogel of a Ferric nitrate-phytic acid complex.

In an embodiment of the present invention, the proton conductivity of the gel is in the range of $8.6 \times 10^{-3}$ S·cm$^{-1}$ to $2.4 \times 10^{-2}$ S·cm$^{-1}$ at 120° C.

In another embodiment, present invention provides a process for the preparation of proton conducting metallogel and the said process comprising the steps of:

mixing Fe (NO$_3$)$_3$·9H$_2$O (FN) and phytic acid (PA) solution in the ratio ranging between 1:1 to 3:1 v/v in solvent to obtain a solution;

aging the solution as obtained in step (i) at temperature in the range of 80 to 90° C. followed by evaporating at 70-80° C. to obtain proton conducting metallogel.

In yet another embodiment of the present invention, diameter of the nanospheres is in the range of 10 to 120 nm.

In yet another embodiment of the present invention, wherein the gel is porous or non porous.

In yet another embodiment of the present invention, wherein said gel is used to fabricate membrane electrode assembly (MEA) in fuel cell.

In yet another embodiment of the present invention, wherein said gel is used to fabricate membrane electrode assembly (MEA) in proton exchange membrane fuel cell (PEMFCs).

In yet another embodiment of the present invention, wherein open circuit voltages (OCV) of the gel in fabricated Membrane Electrode Assembly (MEA) is 1.02 V±0.02 at 120° C.

BRIEF DESCRIPTION OF THE DRAWINGS

FIG. 1: shows schematic representation of synthesis of FNPA metallogel and Optical micrographs of FNPA metallogel, FNPA xerogel, powdered xerogel and pelletized FNPA xerogel used for the proton conduction studies.

FIG. 2: shows the gelation results after 30 min and after aging of 12 hrs.

FIG. 3: shows a) HRTEM images evidencing the formation of FNPA metallogel nanospheres and their eventual aggregation to form a 3D metallogel network. b) Frequency and c) Strain dependent studies of FNPA metallogel (FN:PA=2:1 (v/v) in DMF).

FIG. 4: shows Frequency and strain dependent studies of FNPA metallogel (2:1 v/v).

Equivalent circuit determined for the Nyquist plot obtained at 130° C. with circuit model used for data fitting (inset); c) Proton conductivity measured during first and second run; d) Schematic representation of MEA making using pelletized FNPA Xerogel as solid electrolyte; e) OCV measurement: f) Fuel cell polarization plot obtained at 80° C. using dry H$_2$, Pt, C/FNPA Xerogel/Pt, C, dry O$_2$ electrochemical cell g) Linear polarization plot obtained using the electrochemical cell at 80° C.

FIG. 6: depicts TGA plots of FNPA-xerogel before and after proton conductivity measurements, for weight loss.

FIG. 7: shows IR spectra of FNPA xerogel.

Figure 8:
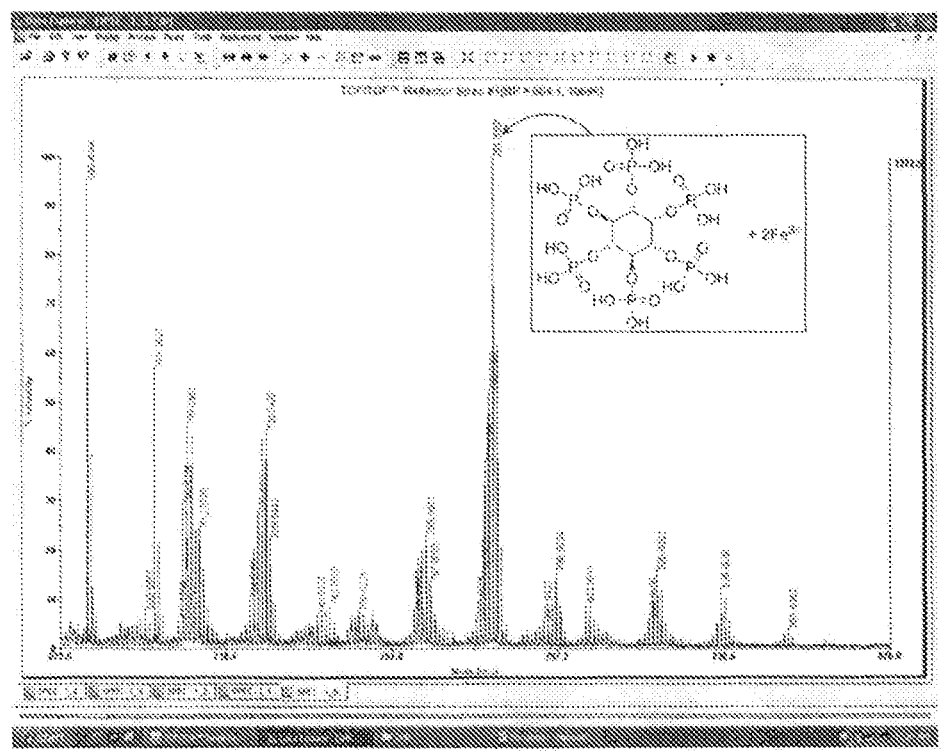

FIG. 8: depicts MALDI-TOF MS for FNPA gel.

Figure 9:
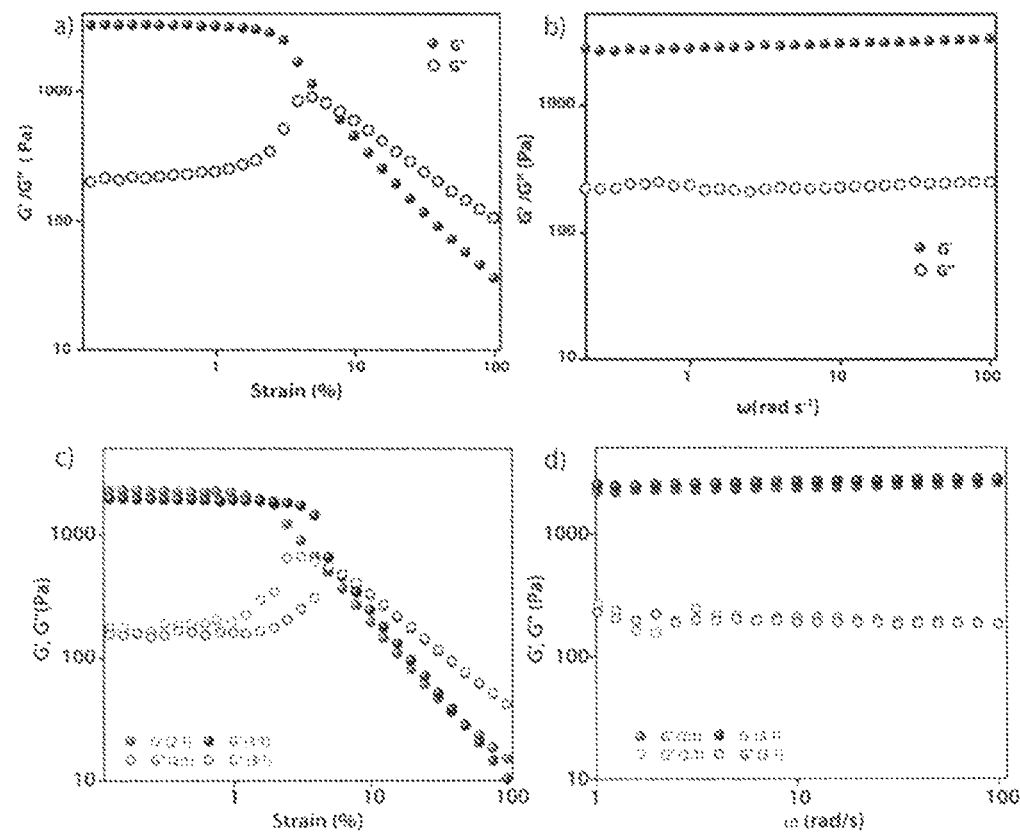

FIG. 9: a) Strain dependent b) Frequency dependent studies of FNPA metallogel (2:1 v/v) synthesized at 90° C., c) Strain dependent d) Frequency dependent studies of FNPA metallogel (2:1 and 3:1 v/v) synthesized at RT after 6 days.

Figure 10:
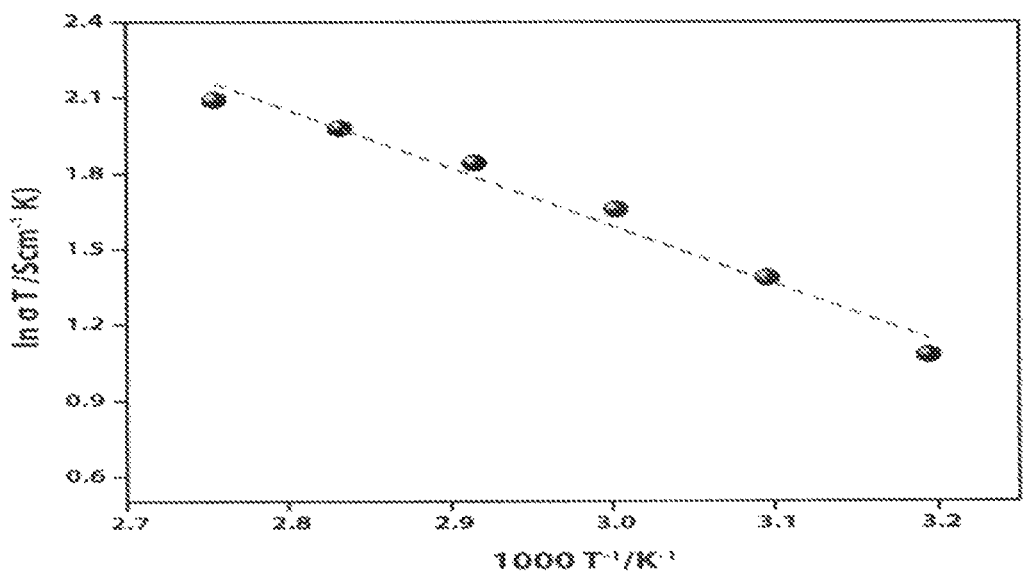

FIG. 10: Arrhenius-type plot obtained at different temperatures.

Figure 11:
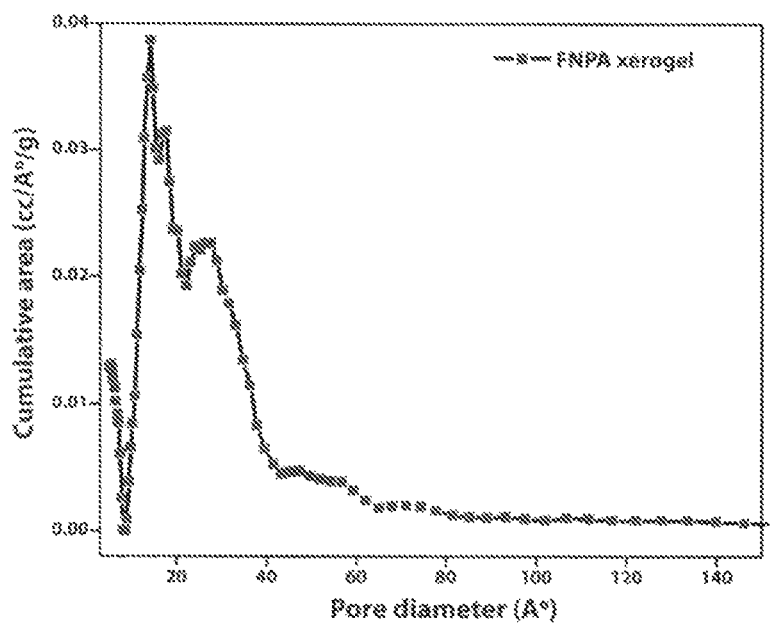

FIG. 11: (a) Pore size distribution of FNPA xerogel (2:1) synthesized at 90° C.

FIG. 12: (a) HRTEM of FNPA metallogel synthesized at (b) 90° C., (c) RT after 6 days.

FIG. 13: High-resolution transmission electron microscopy (HRTEM) image of FNPA xerogel after water treatment (DI water) for 1 week at room temperature i.e. at 20 to 30° C.

FIG. 14: a) Powder X-ray diffraction (PXRD) pattern of FNPA metallogel and xerogel indicating the material's highly amorphous nature. b) TGA plots of FNPA-xerogel before and after proton conductivity measurements.

FIG. 15: TGA profile of FNPA xerogel a): Zoomed view of the TGA profile up to 200° C. b) and isothermal TGA thermograms of FNPA xerogel at three different temperatures (130° C., 150° C. and 160° C.) c). Quantification of weight loss incurred at each step.

Figure 16:
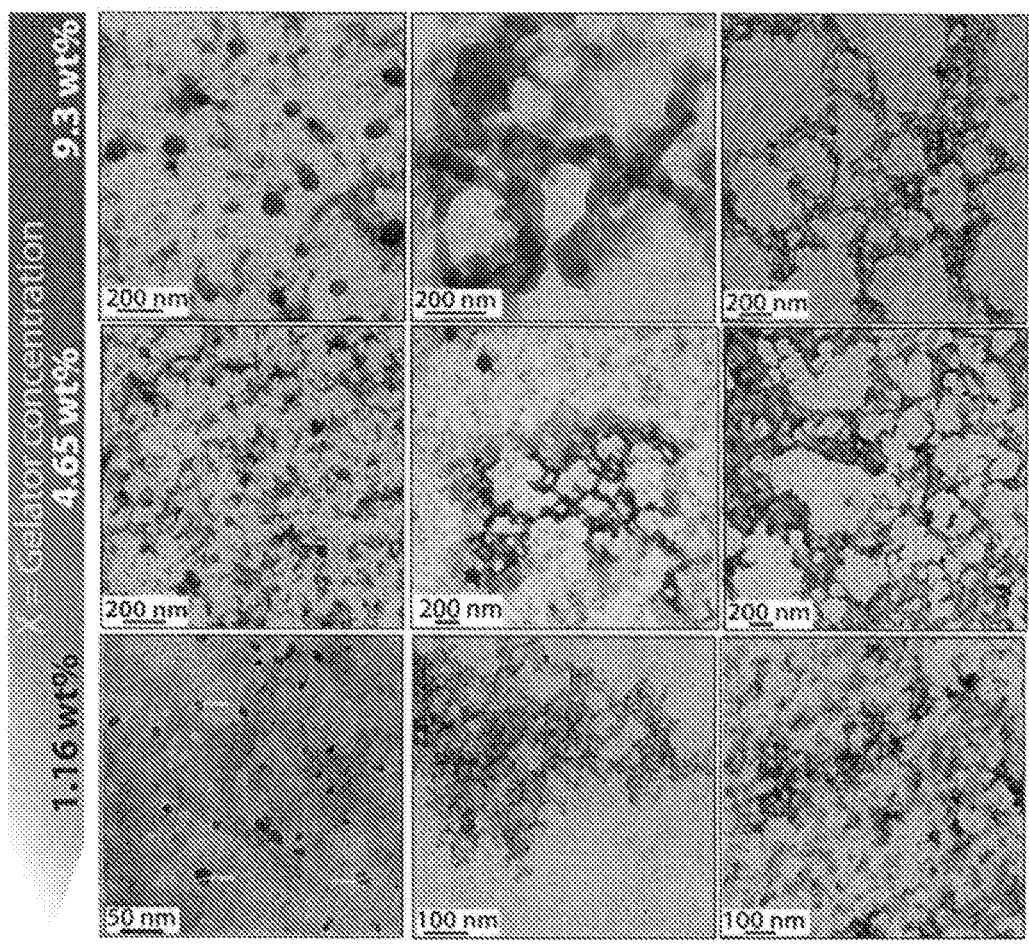

FIG. 16: Concentration-dependent HRTEM analysis of FNPA gel (X=4.65 wt %)

Figure 17:
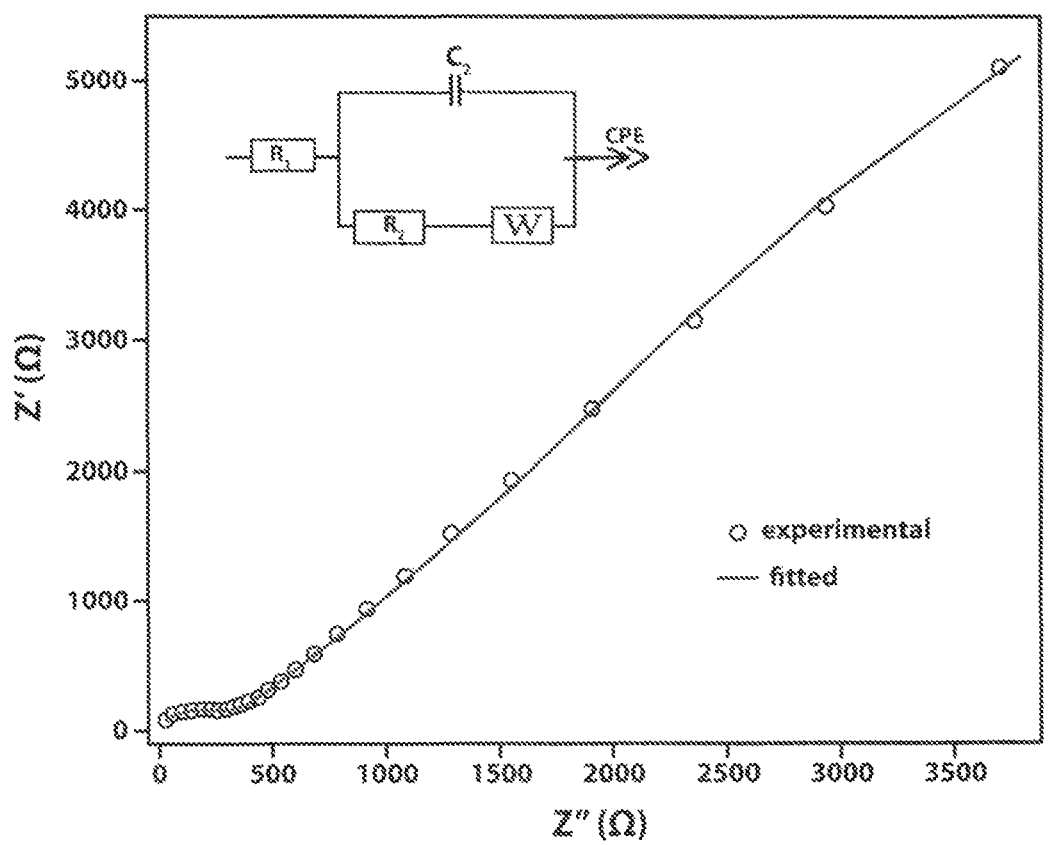

FIG. 17: Equivalent circuit determined for the Nyquist plot obtained at 130° C. with circuit model used for data fitting (inset).

Figure 18:
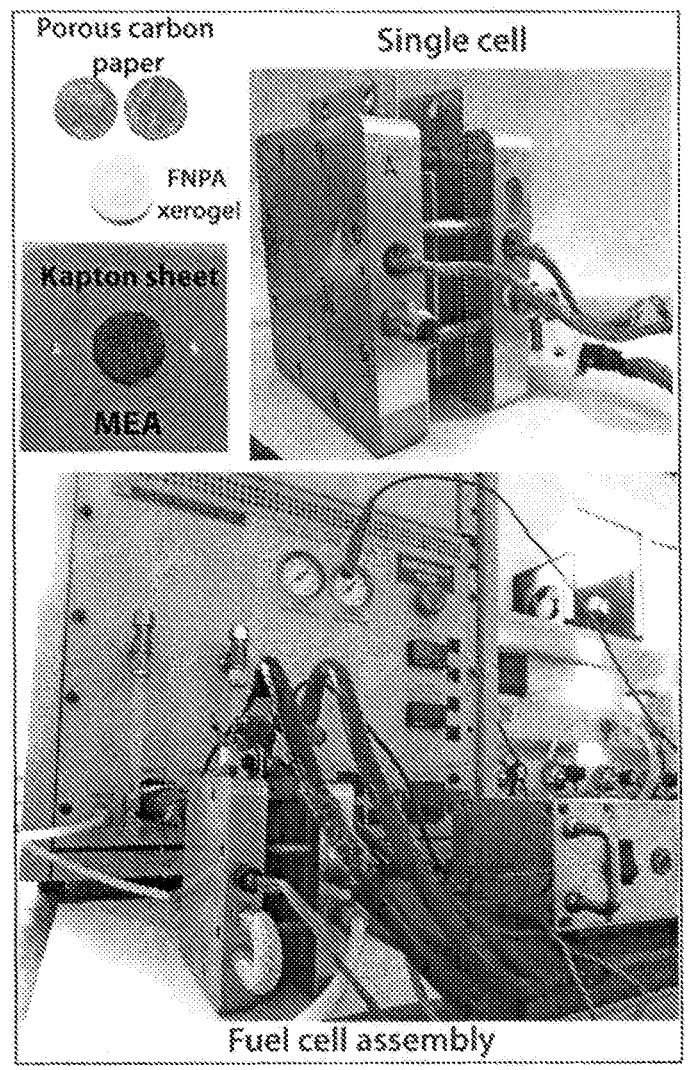

FIG. 18: Optical photograph of the fuel cell assembly using fabricated membrane electrode assembly (MEA) with pelletized FNPA xerogel as solid electrolyte.

Figure 19:
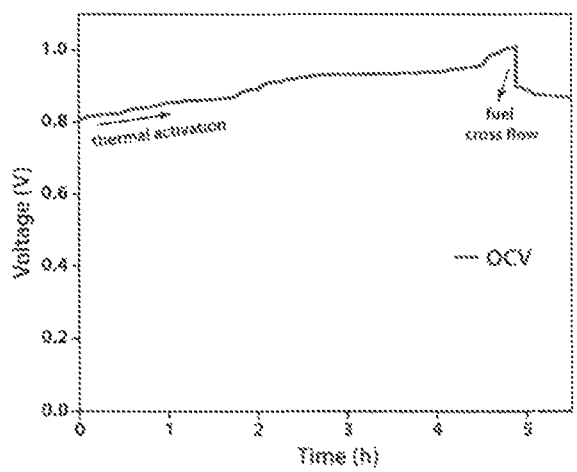

FIG. 19: Lifetime measurement of OCV obtained using the fabricated MEA at 120° C.

Figure 20:
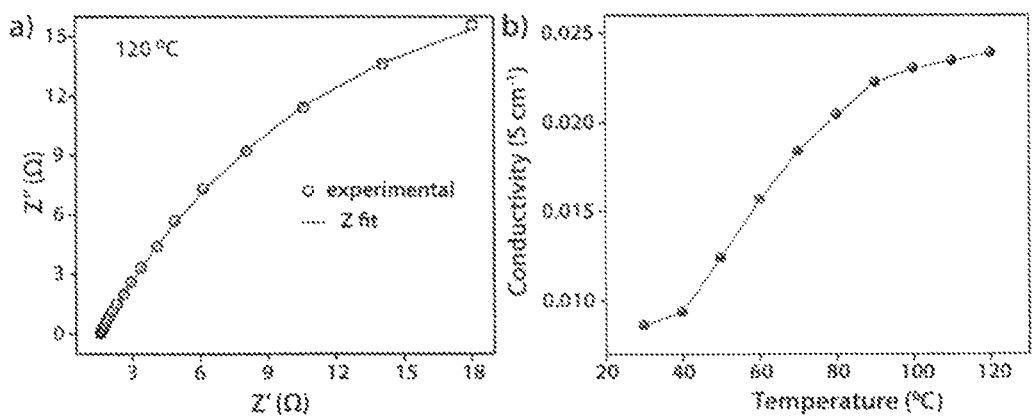

FIG. 20: a) Nyquist plot obtained at 120° C. using MEA; b) variation of MEA membrane conductivity with temperature.

Figure 21:
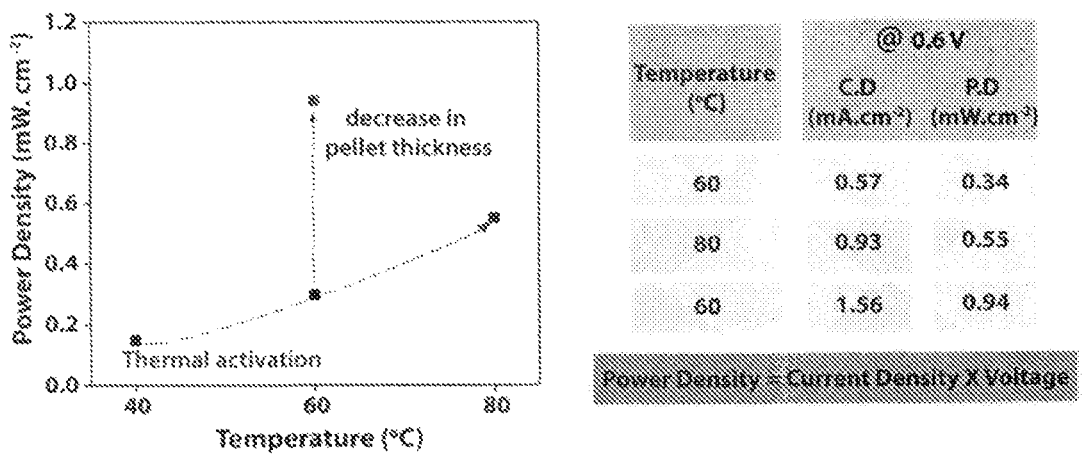

FIG. 21: Plot of power density as a function of temperature indicating the influence of pellet thickness (thicknesses of the two pellets used are 1615 μm and 735 μm).

DETAILED DESCRIPTION OF THE INVENTION

Accordingly, the present invention provides immobilized phytic acid metallogel for use as conducting electrolyte in PEFMCs. The immobilized phytic acid metallogel, herein after referred as 'FNPA metallogel' or 'FNPA xerogel' (derived on slow drying) simultaneously in the entire specification.

Present invention provides a process for preparation of conducting electrolyte of the invention by immobilizing a protogenic ligand (phytic acid) using transition metal ion in N, N'-Dimethyformamide (DMF) which results in a stable metallogel (FNPA).

The transition metals for the purpose of the present invention may be selected from Cr, Co, Fe, Al, Pt, Pd and such like or combinations thereof. The most preferable transition metal ion is Fe$^{3+}$ ion which is derived from Fe(NO$_3$)$_3$·9H$_2$O and the metallogel obtained is referred as FNPA (FN=Ferric nitrate nonahydrate; PA=Phytic acid) metallogel.

In further aspect, said gel is used to fabricate membrane electrode assembly (MEA) in proton exchange membrane fuel cell (PEMFCs).

In still another aspect, the open circuit voltages (OCV) of the gel in fabricated Membrane Electrode Assembly (MEA) is 1.02 V±0.02 at 120° C.

The xerogel derived from FNPA obtained upon drying the FNPA metallogel; exhibits a high proton conductivity of $2.4 \times 10^{-2}$ S·cm$^{-1}$ at 120° C. without assistance of any external agents (moisture, acid or any heterocycle dopants) which establish that the instant metallogel is a unique supramolecular gel material. The proton conductivity of the xerogel is in the range of $8.6 \times 10^{-3}$ S·cm$^{-1}$ to $2.4 \times 10^{-2}$ S·cm$^{-1}$ at 120° C. The xerogel obtained according to the invention may be porous or non-porous and the diameter of the nanospheres is in the range of 10 to 120 nm.

The invention provides linear fuel cell polarization studies to collect the electrical data using the metallogel of the instant invention. These studies ascertain the completion of the electrical circuit of the fuel cell and thus evidently prove the proton conduction across the pelletized xerogel.

The FNPA metallogel according to the invention is synthesized by a simple one pot procedure at 90° C. wherein, 0.1 mmol of Fe (NO$_3$)$_3$.9H$_2$O (FN) and 0.1 mmol of Phytic acid (PA) solution in DMF (2:1 v/v) is mixed together to form a pale yellow colored solution (FIG. 1). Although gelation results within 30 min of heating at 90° C. (as confirmed by tube inversion test), the rheological studies performed on the metallogel indicated it to be of weaker nature. Thus aging of the metallogel is continued for another 12 h in order to further increase the cross-linking of gelator fibers leading to a metallogel with better mechanical strength (FIG. 2). A metallogel exhibiting similar properties could also be obtained at room temperature when the pale-yellow colored solution is left undisturbed for ~6 days (FIG. 1). The off-white colored metallogel obtained is then slowly evaporated at 70-80° C. to obtain FNPA xerogel.

The immobilized phytic acid metallogel according to the invention shows effective entrapment of proton conducting units. The entrapment thus prevents its leaching out during fuel cell operation. As the metallogel is DMF based (B.P=153° C.), the operation temperature is well suited for intermediate temperature Proton exchange Membrane fuel cells (PEMFCs). Since the metallogel is formed due to effective immobilization of Phytic acid via gelation with iron nitrate in DMF, the same helps in eliminating the need for the addition of external proton carrier molecules and further eliminate the problems encountered due to the carrier leaching during the course of fuel cell operation.

The invention provides characterization studies and proton conductivity studies of Xerogel produced according to the invention. According to this aspect, FNPA obtained upon drying the FNPA metallogel is then powdered and pelletized to obtain xerogel, which is used for proton conductivity studies. The pelletized xerogel exhibits a high proton conductivity of $2.4 \times 10$-$2$ S·cm$^{-1}$ at 120° C. without assistance of any external agent (moisture, acid or any heterocycle dopants), thereby establishes that the xerogel according to the invention is a unique supramolecular gel material.

The PXRD pattern of the metallogel as well as xerogel indicated the amorphous nature of the material. Thermogravimetric analysis revealed that the FNPA xerogel is stable up to ~150° C. The HRTEM images of the FNPA metallogel unravels the formation of 20-40 nm sized nanospheres which gradually gets fused together into 3D metallogel network. (FIG. 3a) The N2 sorption studies performed on the FNPA xerogel revealed a BET (Brunauer, Emmett and Teller) surface area of 124 m$^2$/g. Metal-ligand coordination is found to be crucial for gel formation as the gel strength varied depending on the metal:ligand ratio. The metal-ligand ratio according to the invention may be in the range of 2:1 to 1:1. A preferable metal to ligand ratio of 2:1 in the precursor solution forms gel at a much faster rate at room temperature and showed superior mechanical property, (FIG. 2) compared to the other ratios (FIG. 9).

Further, the viscoelastic gel nature of FNPA is verified by a simple inversion-tube test (FIG. 1); refer to the two inverted test tubes with the gel obtained after treatment at RT and 90° C. for 6 days and 30 minutes respectively. FNPA metallogel is found to be robust without any visual change over a period of 6 months. The viscoelastic nature of this opaque metallogel is further quantified by oscillatory rheological studies. Dynamic strain sweep (DSS) test (at constant frequency of 1 rads-1) shows that the average storage modulus (G) is one order magnitude higher than the loss modulus (G") within the linear viscoelastic regime (FIG. 3b and 3c). The storage modulus presented almost null dependence on the frequency (i.e., G'w0.047-0.061, tanδ 0.09-0.13, which is characteristic of viscoelastic fibrillar networks, evident from the dynamic frequency sweep measurements (at constant strain value of 1%). Frequency and strain dependent studies of FNPA metallogel (2:1 v/v) are also shown in (FIG. 4).

The Fourier transform infrared (FT-IR) spectra were taken in the 600-400 cm$^{-1}$ region on a Bruker Optics ALPHA-E spectrometer equipped with universal ZnSe ATR (attenuated total reflection) accessory or using a Diamond ATR (Golden Gate) (FIG. 7) shows strong peak at 3000 cm$^{-1}$ indicates the P—OH group, and the peaks at 1000 to 1200 indicates the formation of Fe-Phytate Xerogel.

MALDI-TOF study of the FNPA gel as well as xerogel exhibit abundance of peaks in low m/z (m/z<1000) region suggesting non-covalent self-assembly of gelator units (FIG. 8). Moreover, a prominent peak at m/z=781.93 (2Fe$^{3+}$+1 Phytic acid+8H$^+$) strongly supports presence of the 2:1 complex (Fe$^{3+}$:Phytic acid) as the gelator unit.

The above-mentioned intriguing observations regarding the mechanical stability as well as rate of formation of FNPA gel based on metal ion (Fe3+) to ligand (phytic acid) ratio hypothesizes that in the smallest gelator unit only two out of six phosphate ester groups chelates to two Fe3+ cations. The presence of identical groups in the phytic acid molecules gives all phosphate ester sites an equal propensity to bind with Fe3+ thereby initially resulting in a non-directional supramolecular assembly of the components (Fe-Phytate complex, water, DMF and other possible ingredients, refer FIG. 3). The nanospheres found in the initial phase of gelation indicate the ready complexation of the multidentate three dimensional phytic acid with Fe3+ in DMF (FIG. 3a). These nanospheres later aggregate via supramolecular forces (H-bonding or co-ordinate bond) giving rise to nanofibrillar network structure which eventually ensnares the whole solvent (DMF) to form monolithic gel structure. This mechanism further helps to establish the reason behind the prospective proton conduction. In an average, four out of six phosphate ester group of a phytic acid molecule remains free after chelating with two Fe3+ ions. These free phosphoester moieties either take part in H-bonding (with another phosphoester group or DMF or water) or remain free. In both of the forms they are capable of conducting protons efficiently. Moreover, fibrillar structure of the gel network further assists in streamlining the conduction of proton.

Figure 5:
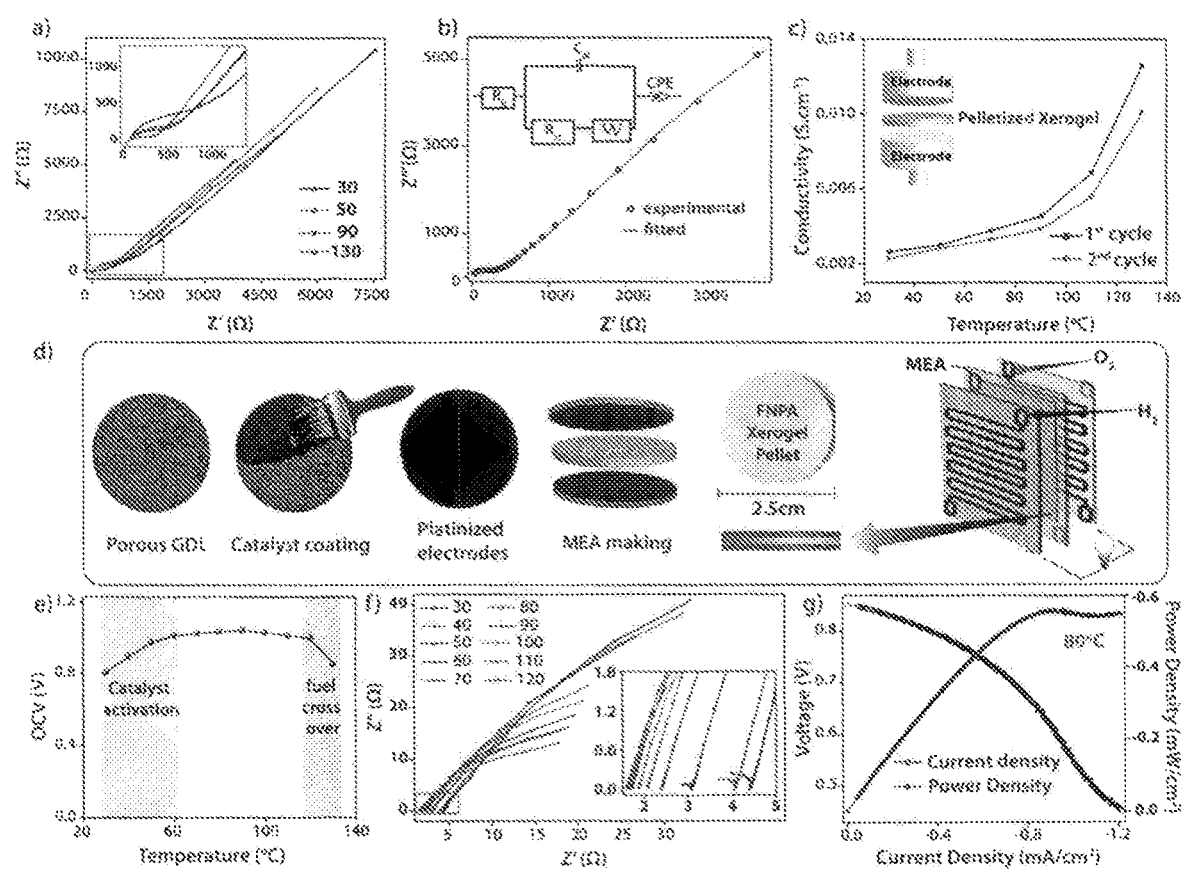
FIG. 5: shows a) Nyquist plots obtained at different temperatures (in C); b)

The intrinsic proton conducting ability of the FNPA metallogel according to the invention is analyzed using two probe A.C impedance measurements (FIG. 5a). The material is observed to conduct protons over a wide range of temperature (30 to 150° C.) in anhydrous conditions. The sample is evacuated at 120° C. to eliminate any residual water molecules present in the xerogel. In the first set of preliminary experiments, pelletized xerogel is manually pressed between two stainless steel electrodes and the entire set up is placed inside a N2 flushed, temperature controlled incubator (SH-241, ESPEC Co. Ltd., Japan) connected to the electrochemical work station. The sample is kept at each temperature for ~1 h in order to attain thermal equilibrium. The impedance measurements are performed at a frequency range of 1 MHz-100 Hz with input volt-age amplitude of 10 mV. The Nyquist plots are resolved using the equivalent circuit (Rb+Cdl/(Rct+WD)+CPEel), where Rb-resistance inherent to the bulk material: Cdl=double layer capacitance; Rct=interfacial charge transfer resistance: WD=Warburg Diffusion; CPE=Constant Phase Element, which accounts for the inhomogeneity and roughness contributions of electrode surface to the total impedance (FIG. 5b).

The plots showed a part of semicircle at high frequency with a pronounced tail at low frequency region which could be attributed to the diffusion limitations resulting due to the blocking effects experienced by protons at the electrodes. This feature thereby excludes the possibility of electronic conduction in the material which is also verified by two probe Direct Current (D.C.) conductivity studies proving the material to be a good insulator with electrical resistivity of $6\times10^7$ Ω/cm. High proton conductivity up to $1\times10^{-2}$ S·cm$^{-1}$ is obtained at 130° C. On continued heating, the conductivity decreased to $3.6\times10^{-3}$ S·cm$^{-1}$ at 150° C. due to possible degradation of the material thereafter (as indicated by TGA analysis). However, the sample retained its conductivity when cooled down to RT from 130° C. and then recycled back (FIG. 5c). TGA plots of FNPA-xerogel before and after proton conductivity measurements, for weight loss are depicted in FIG. 6.

For direct realization of the material as solid electrolyte and separating membrane for PEFMC, as a proof of concept, second set of experiments are carried out at dry $H_2/O_2$ fuel cell conditions. D.C. measurements are carried out by fabricating a gas tight 2×2 cm$^2$ MEA (Membrane Electrode Assembly) using dry $H_2$, dry $O_2$ gases as reactants, Pt—C gas-diffusion electrodes (1 mg of Pt/cm$^2$, ELAT, BASF fuel cell) and pelletized FNPA xerogel (cold pressed at 1000 kg N for 2 min) as solid electrolyte (FIG. 5d). The electromotive force (emf) measurements carried out on the MEA showed a starting Open Circuit Voltage (OCV) of 0.807 V at 30° C. followed by an increment to a maximum of 1.02V±0.02 at 100° C. on thermal activation of the Pt catalyst. Open Circuit Voltage (OCV) remained constant thereafter on further rise in temperature up to 120° C. (FIG. 5e). However, at 130° C. the OCV dropped to 0.85V owing to the fuel cross-over effect. Extrapolating the studies further, an impedance study is simultaneously carried out on the MEA to monitor the entire fuel cell reaction at each temperature (FIG. 5f). The impedance response included a combination of the responses of the cathode (Pt/C, $O_2$) and anode half-cells (Pt/C, $H_2$). The presence of single semicircle inferred that the time constants (a product of interfacial resistance and capacitance) of the two half cells are comparable. At 30° C. the low frequency region of the Nyquist plot clearly showed the presence of a distinct charge transfer resistance (Rct) due to the catalyst layer, and proton conductivity of $8.6\times10^{-3}$ S·cm$^{-1}$. With rise in temperature, an improvement in the interfacial charge transfer is observed which de-escalates the time constant, as evidenced from the disappearance of semi-circle. A high proton conductivity value of $2.4\times10^{-2}$ S·cm$^{-1}$ is obtained at 120° C. before the OCV started decreasing due to the fuel cross flow. The activation energy calculated using the Arrhenius equation is found to be 0.19 eV, indicative of a highly efficient Grotthuss pathway for proton conduction, refer FIG. 10.

The invention provides linear fuel cell polarization studies to collect the electrical data using the metallogel material of the invention. These studies ascertain the completion of the electrical circuit of the fuel cell and thus evidently prove the proton conduction across the pelletized xerogel.

Marking first of such attempt, polarization plots are obtained by driving the fuel cell reaction using FNPA xerogel as solid electrolyte (pellet thickness=1615 μm) and Pt/C electrodes by passing dry hydrogen (35-50 sccm) and oxygen gases (35-50 sccm) at anode and cathode respectively. At 0.6V (standard operating potential of PEFMC fuel cell), a power density of 0.55 mW/cm$^2$ was achieved at 80° C. (FIG. 5g). A similar polarization test was carried out using a pellet with much lower thickness (735 μm). A power density of 0.94 mW/cm$^2$ at 0.6V verified the crucial role of pellet thickness in determining the MEA performance. It was observed that, for an optimal performance, the pellet should be denser enough to prevent fuel cross flow, and also thin enough to keep the cell resistance at its minimal (as Power Density=Current Density×Voltage; V=0.6V). The FNPA metallogel by itself showed a maximum proton conductivity of $2.5\times10^{-3}$ S·cm$^{-1}$ at 90° C. This shows the evident effect of dilution of proton conducting units due to the reduced connectivity among the phosphoric acid functions owing to the copious amount of solvent molecules trapped inside the gel network.

EXAMPLES

The following examples are given by way of illustration and therefore should not be construed to limit the scope of the invention.

Example 1

Synthesis of Metallogel (FNPA)

The chemicals, Ferric (III) nitrate nonahydrate Fe(NO$_3$)$_3$·9H$_2$O, Phytic acid solution (50 wt % in water) used in the present invention were purchased from Sigma Aldrich Chemicals. N, N-Dimethylformamide (DMF) was purchased from Rankem Chemicals. All starting materials were used without further any further purification.

The FNPA (FN=ferric nitrate nonahydrate; PA=phytic acid) metallogel reported here has been synthesized by a simple one pot procedure at 90° C., wherein 0.1 mmol of Fe(NO$_3$)$_3$·9H$_2$O (FN) and 0.1 mmol of phytic acid (PA) solution (2:1 v/v) in DMF were mixed together to form a pale yellow colored solution (S) (FIG. 1). Although the gelation results within 30 min of heating at 90° C. (as confirmed by the tube inversion test), the rheological studies performed on the metallogel indicated it to be of weaker nature. Thus, aging of the metallogel was continued for another 12 h in order to further increase the cross-linking of gelator fibers leading to a metallogel with better mechanical strength (FIG. S1). A metallogel exhibiting similar properties could also be obtained at room temperature when the pale-yellow colored solution (S) was left undisturbed for ~6 days (FIG. 1 and FIGS. 2, 9). The off-white colored metallogel obtained was then slow evaporated at 70-80° C. The resulting FNPA xerogel was then powdered and pelletized for proton conductivity studies.

Example 2 i. Rheology, TGA, FTIR and PXRD Experiments

The Rheology experiments were carried out using a force rebalance transducer equipped TA-ARES rheometer. Couette geometry with cup and bob diameter of 27, 25 mms and height 38 mm was used for the measurements. The PXRD (Powder X-ray Diffraction patterns) were recorded by means of PANalytical X'PERT PRO instrument using iron-filtered Cu K$\alpha$ radiation ($\lambda$=1.5406 Å) in the 2$\theta$ range of 5-50° with a step size of 0.02° and a ramp of 0.3 s/step. The Thermo gravimetric analysis (TGA) experiments were carried out using a SDT Q600 TG-DTA analyzer from 25-800° C. in N2 atmosphere at a heating rate of 10° C. min-1. The Fourier transform infrared (FT-IR) spectra were taken in the 600-4000 cm-1 region on a Bruker Optics ALPHA-E spectrometer equipped with universal ZnSe ATR (attenuated total reflection) accessory or using a Diamond ATR (Golden Gate) as depicted in FIG. 7.

ii. MALDI-TOF MS for FNPA Gel

Matrix assisted laser desorption ionization-time of flight (MALDI-TOF) were performed for FNPA gel using dithranol as matrix. The sample concentration was ca. 1.0 µM in DMF. Concentration of matrix solution (in THF) was made to 1 mg/mL and added to the sample solution in 1:1 ratio. The resulting solution was deposited on a stainless steel sample holder and dried under vacuum. The sample was then scanned with $N_2$ laser (intensity=4500) at a scan rate of 150 shots per spectrum. The samples were analyzed under optimized conditions in positive reflectance mode. A peak at m/z=781.9367 was observed which corresponds to 2Fe$^{3+}$+1 Phytic acid+8H$^+$.

Example 3

Proton Conduction Experimental Details of FNPA Xerogel i. Determination of Proton Conductivity Using Stainless Steel (SS) Electrodes Alternating current (AC) impedance measurements were performed to study the proton conducting ability of the metallogel via quasi-four probe method, ca. 200 mg of FNPA xerogel, obtained on slow drying of FNPA metallogel at 70-80° C., was pressed using a standard die (13 mm diameter) into pellets of 0.25-0.35 cm thickness (Absolute, Mitutoyo Co. Ltd., Japan with accuracy 0.01 mm) and then evacuated at 80° C. under vacuum. The pellet was manually pressed between two stainless steel blocking electrodes. The electrode assembly was then placed inside a temperature controllable incubator (SH-241, ESPEC Co. Ltd., Japan) connected to BioLogic VPM3 electrochemical work station. The set up was flushed with dry $N_2$ before the measurement to ensure complete dryness. The pellet was the heated slowly from RT to 130° C.

The membrane resistance was calculated by fitting the Nyquist plots obtained at each temperature. The proton conductivity of the pelletized xerogel was determined using the following relation;

$$\sigma = l/(R \cdot A)$$

where $\sigma$=proton conductivity (S·cm$^{-1}$),
l=pellet thickness (cm),
R=resistance of the pellet ($\Omega$) and
A=area of the pellet (cm$^{-2}$).

ii. Fabrication of Membrane Electrode Assembly (MEA) using pelletized FNPA xerogel Standard PEFMC protocol was used for the MEA fabrication. Initially, FNPA xerogel powder was pelletized using 2.5 mm diameter die, ca. 800 mg xerogel powder was used for making each pellet. The electrodes were prepared by spraying the Pt catalyst ink onto the porous carbon paper (35CC-SGL with 15% PTFE content). The pellet was then placed in between the two platinized carbon electrodes [each containing Pt catalyst (Johnson Matthey)+Vulcan carbon support (VX 72)+Nafion binder (20%)] with Kapton as gasket and cold pressed by applying 1000 KgN pressure for 2 min. The MEA was then arranged onto graphite plates using FRT gasket for single cell assembly (active area=4 cm$^2$, Fuel cell Tech). The single cell test fixture used for fuel cell polarization study consists of following components:

Aluminium end-plates
Graphite mono polar plates provided with integrated O-ring gasket and serpentine gas flow field
Cathode loading: 1 mg/cm$^2$; N/C: 0.4: electrode thickness: 320 µm
Anode loading: 1 mg/cm$^2$; N/C: 0.4: electrode thickness: 324 µm
Gas flow: 0.5 slpm for anode as well as cathode.
Operating temperature: RT-120° C.
Membrane pellet thickness: 1615 µm
Uncompressed MEA thickness: 2259 µm
Compressed MEA thickness: 1848 µm
% of the compression: 18%
Thickness of Gasket used: 714 µm iii. Electromotive Force Studies (EMF) of Fabricated Membrane Electrode Assembly (MEA):

For EMF measurements, the cell was fed with pure dry hydrogen (99.999%) at anode and pure dry $O_2$ (99.9%) at cathode. The EMF study showed a starting Open Circuit Voltage (OCV) of 0.807 V at 30° C. On further increasing the temperature, the OCV shoot upto 1.02 V±0.02 at 120° C. and remained constant thereafter. The OCV was observed to remain stable for the next 5 h. which clearly reveals the denser nature of the pellet. On further rising the temperature to 130° C. the OCV immediately dropped to 0.85 V and thereafter the study was terminated. The sudden decrease in the OCV could be attributed to the cross flow of the reactant gases across the pellet membrane.

iv. In Situ Impedance Study on the Fabricated Membrane Electrode Assembly (MEA):

The in situ impedance measurements was carried out via two electrode configuration using BioLogic VPM3 electrochemical work station in the frequency range of 1 MHz-100 Hz and 10 mV input voltage amplitude, with 02 passing cathode used as working electrode and $H_2$ passing anode as counter and reference electrodes. The results were studied using Nyqusit plots obtained at each temperature (from RT to 120° C.). The plots were then fit using a PEFMC fuel cell equivalent circuit and the membrane resistance was calculated determined by the intercept made on the real axis at the high frequency regime in the complex impedance plane.

v. Direct Current (D.C) Linear Polarization Studies:

On stabilization, linear polarization studies were performed starting from OCV in 5 mV steps (holding time at each step was 1 sec) until the potential decreased to 0.3V.

ADVANTAGES OF THE INVENTION

1. The entrapment of such phosphonate (($H_2PO_4$) appended ligand eliminates the need for any additional proton carriers. It thereby eradicates the problems of carrier leaching, a limitation of the present phosphoric acid doped polybenzimidazole (PBI) membranes operating at intermediate temperatures.
2. The Membrane Electrode Assembly (MEA) fabricated using the FNPA xerogel proves to be gas tight giving a maximum OCV of 1.02 V±0.02 at 120° C.
3. The in situ impedance measurements performed on the MEA showed that the FNPA xerogel is a potential Proton exchange Membrane Fuel Cell (PEFMC) material with a high anhydrous proton conductivity of $2.4 \times 10^2$ S·cm$^{-1}$ at 120° C.

The invention claimed is:

1. A fuel cell including a membrane electrode assembly (MEA), wherein said fuel cell comprises a metallogel containing electrolyte of a Ferric nitrate-phytic acid complex, wherein the proton conductivity of the metallogel is the range of $8.6 \times 10^{-3}$ S·cm$^{-1}$ to $2.4 \times 10^{-2}$ S·cm$^{-1}$ at 120° C.

2. A fuel cell including a membrane electrode assembly (MEA), in proton exchange membrane fuel cell (PEMFCs) wherein said fuel cell comprises a metallogel containing electrolyte of a Ferric nitrate-phytic acid complex, wherein the proton conductivity of the metallogel is the range of $8.6 \times 10^{-3}$ S·cm$^{-1}$ to $2.4 \times 10^{-2}$ S·cm$^{-1}$ at 120° C.

3. The metallogel as claimed in claim 1, wherein open circuit voltages (OCV) of the metallogel in fabricated Membrane Electrode Assembly (MEA) is 1.02 V±0.02 at 120° C.

* * * * *